United States Patent
Beck et al.

(10) Patent No.: US 9,366,320 B2
(45) Date of Patent: Jun. 14, 2016

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 65 days.

(21) Appl. No.: 14/396,075

(22) PCT Filed: Mar. 13, 2013

(86) PCT No.: PCT/EP2013/055070
§ 371 (c)(1),
(2) Date: Oct. 22, 2014

(87) PCT Pub. No.: WO2013/159998
PCT Pub. Date: Oct. 31, 2013

(65) Prior Publication Data
US 2015/0111687 A1    Apr. 23, 2015

(30) Foreign Application Priority Data

Apr. 25, 2012   (DE) .......................... 10 2012 206 792

(51) Int. Cl.
*F16H 3/66* (2006.01)
*F16H 3/44* (2006.01)

(52) U.S. Cl.
CPC ............ *F16H 3/66* (2013.01); *F16H 2003/445* (2013.01); *F16H 2200/0065* (2013.01);
(Continued)

(58) Field of Classification Search
CPC ................ F16H 3/66; F16H 2003/445; F16H 2200/0065; F16H 2200/0082; F16H 2200/2012; F16H 2200/2046; F16H 2200/2094
USPC ........................................................ 475/276
See application file for complete search history.

(56) References Cited

U.S. PATENT DOCUMENTS

| 3,999,448 A | 12/1976 | Murakami et al. |
| 4,038,888 A * | 8/1977 | Murakami ............. F16H 3/666 |
| | | 475/276 |

(Continued)

FOREIGN PATENT DOCUMENTS

| DE | 29 36 969 A1 | 4/1981 |
| DE | 199 12 480 A1 | 9/2000 |

(Continued)

OTHER PUBLICATIONS

German Search Report Corresponding to 10 2012 206 808.2 mailed Nov. 13, 2012.
German Search Report Corresponding to 10 2012 206 773.6 mailed Nov. 13, 2012.

(Continued)

*Primary Examiner* — Jacob S Scott
(74) *Attorney, Agent, or Firm* — Davis & Bujold, PLLC; Michael J. Bujold

(57) ABSTRACT

Multi-stage transmission comprising four gear sets, eight rotatable shafts and six shift elements. Eighth shaft is connected to suns of first and second sets and is connectable, via third clutch, to drive shaft. Drive shaft is connectable, via first clutch, to fourth shaft connected to ring gear of first set and couplable, via second brake, to housing. Drive shaft is connectable, via second clutch, to seventh shaft connected to carrier of second set and ring gear of third set. Sixth shaft is connected to ring gear of second set and carrier of fourth set and third shaft is connected to sun of third set and is couplable, via first brake, to housing. Fifth shaft is connected to carrier of first set and sun of fourth set and is couplable, via third brake, to housing. Output shaft is connected to carrier of third set and ring gear of fourth set.

16 Claims, 1 Drawing Sheet

(52) U.S. Cl.
CPC . *F16H2200/0082* (2013.01); *F16H 2200/2012* (2013.01); *F16H 2200/2046* (2013.01); *F16H 2200/2094* (2013.01)

(56) References Cited

U.S. PATENT DOCUMENTS

| | | | |
|---|---|---|---|
| 4,395,925 | A | 8/1983 | Gaus |
| 6,572,507 | B1 | 6/2003 | Korkmaz et al. |
| 6,960,149 | B2 | 11/2005 | Ziemer |
| 7,549,942 | B2 | 6/2009 | Gumpoltsberger |
| 7,695,398 | B2 | 4/2010 | Phillips et al. |
| 7,699,743 | B2 | 4/2010 | Diosi et al. |
| 8,210,981 | B2 | 7/2012 | Bauknecht et al. |
| 8,210,982 | B2 | 7/2012 | Gumpoltsberger et al. |
| 8,398,522 | B2 | 3/2013 | Bauknecht et al. |
| 8,444,524 | B2 * | 5/2013 | Gumpoltsberger ....... F16H 3/66 475/276 |
| 2009/0197734 | A1 | 8/2009 | Phillips et al. |
| 2009/0209389 | A1 | 8/2009 | Phillips et al. |

FOREIGN PATENT DOCUMENTS

| | | |
|---|---|---|
| DE | 101 15 995 A1 | 10/2002 |
| DE | 10 2005 010 210 A1 | 9/2006 |
| DE | 10 2006 006 637 A1 | 9/2007 |
| DE | 10 2008 031 970 A1 | 1/2009 |
| DE | 10 2008 000 428 A1 | 9/2009 |
| DE | 10 2008 000 429 A1 | 9/2009 |
| DE | 10 2008 041 195 A1 | 2/2010 |
| DE | 10 2009 019 046 A1 | 11/2010 |
| DE | 10 2009 020 442 A1 | 11/2010 |
| DE | 10 2009 028 670 A1 | 2/2011 |
| JP | 2005-98433 A | 4/2005 |
| JP | 2005-172123 A | 6/2005 |
| JP | 2006-349153 A | 12/2006 |

OTHER PUBLICATIONS

German Search Report Corresponding to 10 2012 206 774.4 mailed Nov. 13, 2012.
German Search Report Corresponding to 10 2012 206 778.7 mailed Nov. 13, 2012.
German Search Report Corresponding to 10 2012 206 782.5 mailed Nov. 13, 2012.
German Search Report Corresponding to 10 2012 206 792.2 mailed Nov. 13, 2012.
German Search Report Corresponding to 10 2012 206 809.0 mailed Nov. 13, 2012.
German Search Report Corresponding to 10 2012 206 817.1 mailed Nov. 13, 2012.
German Search Report Corresponding to 10 2012 206 819.8 mailed Nov. 13, 2012.
International Search Report Corresponding to PCT/EP2013/055066 mailed May 21, 2013.
International Search Report Corresponding to PCT/EP2013/055083 mailed May 21, 2013.
International Search Report Corresponding to PCT/EP2013/055079 mailed May 21, 2013.
International Search Report Corresponding to PCT/EP2013/055068 mailed May 22, 2013.
International Search Report Corresponding to PCT/EP2013/055081 mailed May 22, 2013.
International Search Report Corresponding to PCT/EP2013/055070 mailed May 21, 2013.
International Search Report Corresponding to PCT/EP2013/055077 mailed May 21, 2013.
International Search Report Corresponding to PCT/EP2013/055071 mailed May 21, 2013.
International Search Report Corresponding to PCT/EP2013/055076 mailed May 21, 2013.
Written Opinion Corresponding to PCT/EP2013/055070 mailed May 21, 2013.

* cited by examiner

| GEAR | ENGAGED SHIFT ELEMENT ||||||  GEAR RATIO $i$ | GEAR INTERVAL $\varphi$ |
| --- | --- | --- | --- | --- | --- | --- | --- | --- |
| | BRAKE ||| CLUTCH ||| | |
| | 03 | 04 | 05 | 14 | 17 | 18 | | |
| 1 | x | | x | | | x | 3.805 | 1.443 |
| 2 | x | x | | | | x | 2.636 | 1.491 |
| 3 | x | | | x | | x | 1.768 | 1.322 |
| 4 | x | | | | x | x | 1.337 | 1.337 |
| 5 | | | | x | x | x | 1.000 | 1.258 |
| 6 | | x | | | x | x | 0.795 | 1.128 |
| 7 | | | x | | x | x | 0.705 | 1.256 |
| 8 | | x | x | | | x | 0.561 | 1.327 |
| 9 | | | x | x | | x | 0.423 | TOTAL |
| R | x | | | x | x | | −2.378 | 9.001 |
| M | x | | x | | x | | 1.337 ||
| M | x | | | x | x | | 1.337 ||
| M | x | x | | | x | | 1.337 ||

MULTI-SPEED GEARBOX

This application is a National Stage completion of PCT/EP2013/055070 filed Mar. 13, 2013, which claims priority from German patent application serial no. 10 2012 206 792.2 filed Apr. 25, 2012.

FIELD OF THE INVENTION

The present invention relates to a multi-stage transmission of a planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Such an automatic transmission is known, for example, from DE 199 12 480 B4 by the applicant. It comprises three single-carrier planetary gear sets, as well as three brakes and two clutches for shifting six forward gears and one reverse gear, a input shaft and an output shaft, wherein the carrier for the first planetary gear set is continuously connected to the ring gear of the second planetary gear set, and the carrier for the second planetary gear set is continuously connected to the ring gear of the third planetary gear set, and the input shaft is directly connected to the sun gear of the second planetary gear set.

Furthermore, in the known transmission, the input shaft is connectable, by means of the first clutch, to the sun gear of the first planetary gear set and, by means of the second clutch, to the carrier of the first planetary set, wherein the sun gear of the first planetary gear set is connectable, by means of the first brake, to a housing of the transmission, and the carrier of the first planetary gear set is connectable, by means of the second brake, to the housing of the transmission, wherein the sun gear of the third planetary gear set is connectable, by means of the third brake, to the housing of the transmission. The input shaft of the transmission is continuously connected to the carrier for the third planetary gear set and the ring gear of the first planetary gear set.

Furthermore, a nine-speed multi-stage transmission is known from DE 29 36 969 A1; it comprises eight shift elements and four planetary gear sets, wherein one planetary gear set serves as a front-mounted transmission and the main gearing includes a Simpson set and a further planetary gear set serving as a reverse gearing.

Further multi-stage transmissions are known, for example, from the applicant's DE 10 2005 010 210 A1 and DE 10 2006 006 637 A1.

Automatically shiftable vehicle transmissions of a planetary design are already generally described numerous times in the prior art and are continually undergoing further development and improvement. These transmissions should have a relatively simple design, in particular requiring a low number of shift elements, and minimize the need for double shifting, i.e., engaging and/or disengaging two shift elements, when sequential shifting is performed, thereby ensuring that only one shift element is ever switched when shifting is performed in defined groups of gears.

The applicant's document, DE 10 2008 000 428 A1, discloses a multi-stage transmission of a planetary design that includes an input drive and an output drive which are disposed in a housing. In the known transmissions, at least four planetary gear sets, referred to in the following as the first, second, third and fourth planetary gear sets, at least eight rotatable shafts, referred to in the following as the drive shaft, output shaft, third, fourth, fifth, sixth, seventh and eighth shafts, as well as at least six shift elements, comprising brakes and clutches, are provided, the selective engagement of which produces different transmission ratios between the input drive and the output drive, so that preferably nine forward gears and one reverse gear can be implemented.

The first and second planetary gear sets, which are preferably designed as minus planetary gear sets, thus having a negative stationary transmission ratio, form a shiftable front-mounted gear set, wherein the third and fourth planetary gear sets form a main gear set.

In the known multi-stage transmission, the carriers of the first and second planetary gear sets are coupled together via the fourth shaft which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a housing of the transmission by means of the third shaft, via a first brake, and is detachably connectable to the drive shaft via a second clutch, wherein the ring gear of the second planetary gear set can be coupled to a housing of the transmission by means of the fifth shaft via a second brake. In addition, the seventh shaft is permanently connected to at least one element of the main gear set, and can be coupled to the housing of the transmission via a third brake, and the sixth shaft is permanently connected to at least one further element of the main gear set and is detachably connectable to the drive shaft, via a third clutch; the output shaft is permanently connected at least to one further element of the main gear set.

In the known transmission, the fourth shaft is preferably permanently connected to the ring gear of the third planetary gear set, the sixth shaft is permanently connected to the ring gear of the fourth planetary gear set and to the carrier of the third planetary gear set, and is detachably connectable to the drive shaft via the third clutch. Furthermore, the seventh shaft is permanently connected to the sun gears of the third and fourth planetary gear sets, and can be coupled to a housing of the transmission, via the third brake. In this case, the output drive is produced via the output shaft that is permanently connected to the carrier of the fourth planetary gear set. Furthermore, the third and fourth planetary gear sets can be combined or reduced to a Ravigneaux set having a common carrier and a common ring gear.

According to the prior art, the shift elements of multi-stage transmission thus designed, which are usually designed as lamellar clutches or brakes, are actuated hydraulically, which disadvantageously results in significant hydraulic losses. In order to avoid these actuation losses, the use of shift elements that can be actuated upon demand would be especially advantageous.

Shift elements that can be actuated upon demand may be understood, in particular, to be shift elements for maintaining the shift state, thus which use no energy or less energy when disengaged or engaged than when switching the shift state.

In order to make it possible to use shift elements that can be actuated upon demand, the shift elements, in particular the clutches, should be easily accessible from outside.

SUMMARY OF THE INVENTION

The object of the present invention is to propose a multi-stage transmission of the initially described type, which has nine forward gears and a reverse gear having a sufficient transmission ratio, in which the design complexity, the component load and the installation size are optimized, and in which efficiency is improved. In addition, the shift elements of the transmission should be easily accessible from outside, which makes it possible to install shift elements that can be actuated upon demand. In addition, the transmission should be suitable for standard design and for a frontal transverse design.

Accordingly, a multi-stage transmission, according to the invention, of a planetary design is proposed which has an input shaft and an output shaft, which are disposed in a housing. In addition, there are provided at least four planetary gear sets which are designated, in the following, as the first, second, third, and fourth planetary gear sets, eight rotatable shafts which are designated, in the following, as the drive shaft, output shaft, third, fourth, fifth, sixth, seventh, and eighth shafts, and six shift elements, preferably designed as lamellar shift elements or as a form locking shift element, comprising brakes and clutches, whose selective engagement produces different transmission ratios between the drive shaft and the output shaft and, therefore, preferably nine forward gears and one reverse gear can be realized.

The planetary gear sets of the transmission are preferably designed as minus planetary gear sets.

As is well known, a simple minus planetary gear set comprises a sun gear, a ring gear, and a carrier on which the planetary gears are rotatably carried, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably carried, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and a positive stationary transmission ratio results.

According to the invention, the sun gear of the first planetary gear set is connected to the eighth shaft, which is connected to the sun gear of the second planetary gear set and which can be detachably connected via a third clutch to the drive shaft, wherein the drive shaft can be detachably connected, via a first clutch, to the fourth shaft which is connected to the ring gear of the first planetary gear set and which can be coupled, via a second brake, to the housing. In addition, the drive shaft can be detachably connected, via a second clutch, to the seventh shaft which is connected to the carrier of the second planetary gear set and the ring gear of the third planetary gear set.

In addition, the sixth shaft is connected to the ring gear of the second planetary gear set and to the carrier of the fourth planetary gear set, wherein the third shaft is connected to the sun gear of the third planetary gear set and can be coupled, via a first brake, to the housing.

In addition, the fifth shaft is connected to the carrier of the first planetary gear set and the sun gear of the fourth planetary gear set and can be coupled, via a third brake, to the housing, wherein the output shaft of the transmission is connected to the carrier of the third planetary gear set and the ring gear of the fourth planetary gear set.

Because the first, second and third clutches are disposed on the drive shaft of the transmission and the remaining shift elements are designed as brakes, good accessibility of all the shift elements of the transmission is ensured, as a result of which the shift elements may be designed as shift elements that can be actuated upon demand. Within the context of further embodiments, the shift elements of the transmission may be designed, inter alia, as shift elements that can be hydraulically actuated.

In addition, transmission ratios that are especially suitable for passenger vehicles are attained, as well as a greater overall gear ratio of the multi-stage transmission, which results in improved driving comfort and a significant reduction in fuel consumption.

Furthermore, design complexity is significantly reduced with the multi-stage transmission, according to the invention, due to a low number of shift elements. Using the multi-stage transmission according to the invention, it is advantageously possible to perform a start-up using a hydrodynamic converter, an external start-up clutch, or any other suitable external start-up element. It is also conceivable to perform a start-up using a start-up element integrated in the transmission. Preferably, a shift element that is actuated in the first forward gear and in the reverse gear is suitable for this.

Moreover, the multi-stage transmission, according to the invention, results in good efficiency in the main drive gears with respect to drag losses and gearing losses.

Low torques are advantageously present in the shift elements and in the planetary gear sets of the multi-stage transmission, thereby advantageously reducing wear in the multi-stage transmission. In addition, the low torques make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following, as an example, with reference to the attached Figures. They show.

DETAILED DESCRIPTION OF THE PREFERRED EMBODIMENTS

Figures 1, 2:
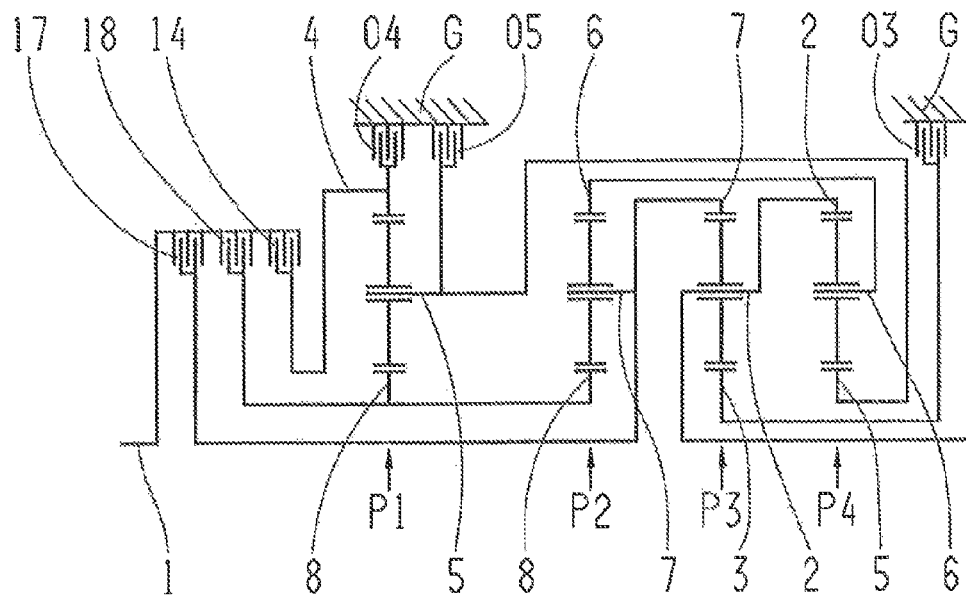
FIG. 1: a schematic view of a preferred embodiment of a multi-stage transmission according to the invention.
FIG. 2: an example of a shift pattern for a multi-stage transmission according to FIG. 1.

FIG. 1 shows a multi-stage transmission, according to the invention, which has a drive shaft 1, an output shaft 2, and four planetary gear sets P1, P2, P3 and P4 which are disposed in a housing G. In the example shown in FIG. 1, planetary gear sets P1, P2, P3, P4 are designed as minus planetary gear sets. According to the invention, at least one of the planetary gear sets P1, P2, P3, P4 can be implemented as a plus planetary gear set, if the carrier and the ring gear connection are exchanged and, simultaneously, the value of the stationary transmission ratio is increased by 1 in comparison to the embodiment as a minus planetary gear set.

In the embodiment shown here, viewed axially, the planetary gear sets P1, P2, P3, P4 are disposed in the sequence of the first planetary gear set P1, the second planetary gear set P2, the third planetary gear set P3, the fourth planetary gear set P4. According to the invention, the axial sequence of the individual planetary gear sets and the configuration of the shift elements may be freely selected as long as this allows the elements to connect.

As shown in FIG. 1, six shift elements are provided, namely, three brakes, 03, 04, 05 and three clutches 14, 17, 18. The spatial disposition of the shift elements can be arbitrary, and is limited only by the dimensions of the exterior design. The clutches and the brakes of the transmission are preferably designed as friction elements or lamellar shift elements, respectively; however they may also be designed as form-locking shift elements.

Selective shifting of nine forward gears and one reverse gear can be realized using these shift elements. The multi-stage transmission, according to the invention, has a total of eight rotatable shafts, namely, the shafts 1, 2, 3, 4, 5, 6, 7 and 8, wherein the drive shaft forms the first shaft, and the output shaft forms the second shaft of the transmission.

According to the invention, in the multi-stage transmission according to FIG. 1, it is provided that the sun gear of the first planetary gear set P1 is connected to the eighth shaft 8, which is connected to the sun gear of the second planetary gear set P2 and which can be detachably connected, via a third clutch 18, to the drive shaft 1, wherein the drive shaft 1 can be detachably connected, via a first clutch 14, to the fourth shaft 4, which is connected to the ring gear of the first planetary gear set P1 and which can be coupled, via a second brake 04, to the housing G. With reference to FIG. 1, the drive shaft 1 can be detachably connected, via a second clutch 17, to the seventh shaft 7, which is connected to the carrier of the second planetary gear set P2 and the ring gear of the third planetary gear set P3.

As shown in FIG. 1, the sixth shaft 6 is connected to the ring gear of the second planetary gear set P2 and to the carrier of the fourth planetary gear set P4, wherein the third shaft 3 is connected to the sun gear of the third planetary gear set P3 and can be coupled via a first brake 03 to the housing G.

In addition, the fifth shaft 5 is connected to the carrier of the first planetary gear set P1 and the sun gear of the fourth planetary gear set P4 and can be coupled, via a third brake 05, to the housing G, wherein the output shaft 2 of the transmission is connected to the carrier of the third planetary gear set P3 and the ring gear of the fourth planetary gear set P4.

In connection herewith, viewed axially, the first, second and third clutch 14, 17, 18 may be disposed side by side and may be designed as lamellar shift elements and have a common external disk carrier. In the embodiment shown, the first brake 03, in particular, is suited for design as a dog clutch element, which significantly improves fuel consumption.

FIG. 2 shows an example of a shift pattern of a multi-stage transmission according to FIG. 1. Three shift elements are engaged for every gear. The shift pattern shows, as examples, the particular transmission ratios I of the individual gear steps and, to be determined therefrom, the gear increments or step changes φ to the next higher gear, wherein the value 9.001 is the transmission ratio spread.

In the example shown, the values for the stationary transmission ratios of the planetary gear sets P1, P2, P3, P4, implemented as minus planetary gear sets, are −1.600, −3.900, −2.965 and −2.385, respectively. FIG. 2 shows that only one shift element must be engaged and one shift element must be disengaged when shifting sequentially, since two neighboring gear steps jointly use two shift elements. It is also shown that a large transmission ratio spread is attained with small gear increments.

The first forward gear is attained by engaging the first and third brakes 03, 05 and the third clutch 18, the second forward gear is attained by engaging the first and second brakes 03, 04 and the third clutch 18, the third forward gear is attained by engaging the first brake 03 and the first and third clutches 14, 18, the fourth forward gear is attained by engaging the first brake 03 and the second and third clutches 17, 18, the fifth forward gear, which is designed as a direct gear in the example shown, is attained by engaging the first, second and third clutches 14, 17, 18, the sixth forward gear is attained by engaging the second brake 04 and the second and third clutches 17, 18, the seventh forward gear is attained by engaging the third brake 05 and the second and third clutches 17, 18, the eighth forward gear is attained by engaging the second and third brakes 04, 05 and the second clutch 17, and the ninth forward gear is attained by engaging the third brake 05 and the first and second clutches 14, 17, wherein the reverse gear is attained by engaging the first and third brakes 03, 05 and the first clutch 14.

Alternatively, the fourth forward gear may be shifted by means of additional shift combinations, which are designated as M in FIG. 2. Accordingly, the fourth forward gear can be attained by engaging the first and second brakes 03, 04 and the second clutch 17, or by engaging the first brake 03 and the first and second clutch 14, 17, or by engaging the first and third brake 03, 05 and the second clutch 17.

Since the first and third brakes 03, 05 and the first and third clutches 14, 18 are engaged in the first forward gear and/or in the reverse gear, these shift elements can be used as start-up elements.

According to the invention, different gear increments also result from the same gear pattern depending on the shift logic, thereby making it possible to implement an application-specific or a vehicle-specific variation.

According to the invention, it is also optionally possible to provide additional freewheels at each suitable location of the multi-staged transmission, for example, between a shaft and the housing, or possibly to connect two shafts.

An axle differential and/or a distributor differential can be disposed on the drive side or on the output side.

Within the scope of an advantageous development of the invention, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch, or the like, can be used as the clutch element. It is also possible to dispose such a start-up element in the power flow direction after the transmission wherein, in this case, the drive shaft 1 is continuously connected to the crankshaft of the drive motor.

The multi-stage transmission, according to the invention, also makes it possible to situate a torsional-vibration damper between the drive motor and the transmission.

Within the scope of a further, not depicted embodiment of the invention, a wear-free brake, for instance, a hydraulic or an electric retarder or the like, can be disposed on each shaft, preferably on the drive shaft 1 or the output shaft 2, which is of special significance for use, in particular, in commercial vehicles. Furthermore, a power take-off drive can be provided on each shaft, preferably on the input shaft 1 or the output shaft 2, for driving additional assemblies.

The friction shift elements that are used can be designed as power shiftable clutches or brakes. In particular, force-locking clutches or brakes can be used, for instance, lamellar clutches, band brakes, and/or cone clutches.

A further advantage of the multi-stage transmission presented here is that an electric machine can be attached to each shaft as a generator and/or as an additional drive machine.

REFERENCE CHARACTERS 1 first shaft, drive shaft
2 second shaft, output shaft 3 third shaft
4 fourth shaft
5 fifth shaft
6 sixth shaft
7 seventh shaft
8 eighth shaft
03 first brake
04 second brake
05 third brake
14 first clutch
17 second clutch
18 third clutch
G housing
P1 first planetary gear set
P2 second planetary gear set
P3 third planetary gear set
P4 fourth planetary gear set
i transmission ratio
φ step change

The invention claimed is:
1. A multi-stage transmission of a planetary design comprising:
   a drive shaft (1),
   an output shaft (2),
   four planetary gear sets (P1, P2, P3, P4) which are disposed within a housing (G), and each of the four planetary gear sets (P1, P2, P3, P4) having a sun gear, a carrier and a ring gear,
   a total of eight rotatable shafts (1, 2, 3, 4, 5, 6, 7, 8), including the drive shaft, the output shaft, a third shaft, a fourth shaft, a fifth shaft, a sixth shaft, a seventh shaft and an eighth shaft, as well as six shift elements (03, 04, 05, 14, 17, 18) comprising brakes (03, 04, 05) and clutches (14, 17, 18) whose selective engagement produces different transmission ratios between the drive shaft (1) and the output shaft (2) so that first, second, third, fourth, fifth, sixth, seventh, eight and ninth forward gears and a reverse gear can be implemented,
   wherein the sun gear of the first planetary gear set (P1) is connected to the eighth shaft (8), the eighth shaft (8) is also connected to the sun gear of the second planetary gear set (P2), and the eighth shaft (8) can be detachably connected, via a third clutch (18), to the drive shaft (1),
   the drive shaft (1) can be detachably connected, via a first clutch (14), to the fourth shaft (4), and the fourth shaft (4) is connected to the ring gear of the first planetary gear set (P1) and the fourth shaft (4) can be coupled, via a second brake (04), to the housing (G),
   the drive shaft (1) can be detachably connected, via a second clutch (17), to the seventh shaft (7), and the seventh shaft (7) is connected to both the carrier of the second planetary gear set (P2) and the ring gear of the third planetary gear set (P3),
   the sixth shaft (6) is connected to both the ring gear of the second planetary gear set (P2) and the carrier of the fourth planetary gear set (P4),
   the third shaft (3) is connected to the sun gear of the third planetary gear set (P3) and the third shaft (3) can be coupled, via a first brake (03), to the housing (G),
   the fifth shaft (5) is connected to both the carrier of the first planetary gear set (P1) and the sun gear of the fourth planetary gear set (P4), and the fifth shaft (5) can be coupled, via a third brake (05), to the housing (G), and
   the output shaft (2) is connected to both the carrier of the third planetary gear set (P3) and the ring gear of the fourth planetary gear set (P4).

2. The multi-stage transmission according to claim 1, wherein the first, the second, the third and the fourth planetary gear sets (P1, P2, P3, P4) are each designed as minus planetary gear sets.

3. The multi-stage transmission according to claim 1, wherein the four planetary gear sets are disposed, when viewed axially, in a sequence of the first planetary gear set (P1), the second planetary gear set (P2), the third planetary gear set (P3) and the fourth planetary gear set (P4).

4. The multi-stage transmission according to claim 1, wherein the shift elements (03, 04, 05, 14, 17, 18) of the transmission are designed as shift elements that can be actuated upon demand.

5. The multi-stage transmission according to claim 1, wherein the first brake (03) is designed as a form-locking shift element.

6. The multi-stage transmission according to claim 1, wherein the first forward gear is attained by engaging the first and the third brakes (03, 05) and the third clutch (18),
   the second forward gear is attained by engaging the first and second brakes (03, 04) and the third clutch (18),
   the third forward gear is attained by engaging the first brake (03) and the first and third clutches (14, 18),
   the fourth forward gear is attained by engaging the first brake (03) and the second and the third clutches (17, 18),
   the fifth forward gear is attained by engaging the first, the second and the third clutches (14, 17, 18),
   the sixth forward gear is attained by engaging the second brake (04) and the second and the third clutches (17, 18),
   the seventh forward gear is attained by engaging the third brake (05) and the second and the third clutches (17, 18),
   the eighth forward gear is attained by engaging the second and the third brakes (04, 05) and the second clutch (17),
   the ninth forward gear is attained by engaging the third brake (05) and the first and the second clutches (14, 17), and
   the reverse gear is attained by engaging the first and the third brakes (03, 05) and the first clutch (14).

7. The multi-stage transmission according to claim 1, wherein the first forward gear is attained by engaging the first and the third brakes (03, 05) and the third clutch (18),
   the second forward gear is attained by engaging the first and the second brakes (03, 04) and the third clutch (18),
   the third forward gear is attained by engaging the first brake (03) and the first and the third clutches (14, 18),
   the fourth forward gear is attained by engaging the first and the second brakes (03, 04) and the second clutch (17),
   the fifth forward gear is attained by engaging the first, the second and the third clutches (14, 17, 18),
   the sixth forward gear is attained by engaging the second brake (04) and the second and the third clutches (17, 18),
   the seventh forward gear is attained by engaging the third brake (05) and the second and the third clutches (17, 18),
   the eighth forward gear is attained by engaging the second and the third brakes (04, 05) and the second clutch (17),
   the ninth forward gear is attained by engaging the third brake (05) and the first and the second clutches (14, 17), and
   the reverse gear is attained by engaging the first and the third brakes (03, 05) and the first clutch (14).

8. The multi-stage transmission according to claim 1, wherein the first forward gear is attained by engaging the first and the third brakes (03, 05) and the third clutch (18),
   the second forward gear is attained by engaging the first and the second brakes (03, 04) and the third clutch (18),
   the third forward gear is attained by engaging the first brake (03) and the first and the third clutches (14, 18), the fourth forward gear is attained by engaging the first brake (03) and the first and the second clutches (14, 17), the fifth forward gear is attained by engaging the first, the second and the third clutches (14, 17, 18), the sixth forward gear is attained by engaging the second brake (04) and the second and the third clutches (17, 18), the seventh forward gear is attained by engaging the third brake (05) and the second and the third clutches (17, 18), the eighth forward gear is attained by engaging the second and the third brakes (04, 05) and the second clutch (17), the ninth forward gear is attained by engaging the third brake (05) and the first and the second clutches (14, 17), and the reverse gear is attained by engaging the first and the third brakes (03, 05) and the first clutch (14).

9. The multi-stage transmission according to claim 1, wherein the first forward gear is attained by engaging the first and the third brakes (03, 05) and the third clutch (18), the second forward gear is attained by engaging the first and the second brakes (03, 04) and the third clutch (18), the third forward gear is attained by engaging the first brake (03) and the first and the third clutches (14, 18), the fourth forward gear is attained by engaging the first and the third brakes (03, 05) and the second clutch (17), the fifth forward gear is attained by engaging the first, the second and the third clutches (14, 17, 18), the sixth forward gear is attained by engaging the second brake (04) and the second and the third clutches (17, 18), the seventh forward gear is attained by engaging the third brake (05) and the second and the third clutches (17, 18), the eighth forward gear is attained by engaging the second and the third brakes (04, 05) and the second clutch (17), the ninth forward gear is attained by engaging the third brake (05) and the first and the second clutches (14, 17), and the reverse gear is attained by engaging the first and the third brakes (03, 05) and the first clutch (14).

10. The multi-stage transmission according to claim 1, wherein the multi-stage transmission is an automatic transmission for a motor vehicle.

11. A multi-stage transmission of a planetary design comprising:

a drive shaft, an output shaft, four planetary gear sets which are disposed within a housing, and each of the four planetary gear sets comprises a sun gear, a ring gear and a carrier, a total of eight rotatable shafts, including the drive shaft, the output shaft, a third shaft, a fourth shaft, a fifth shaft, a sixth shaft, a seventh shaft and an eight shaft, as well as six shift elements comprising brakes and clutches whose selective engagement produces different transmission ratios between the drive shaft and the output shaft so that first, second, third, fourth, fifth, sixth, seventh, eight and ninth forward gears and a reverse gear can be implemented, wherein the sun gear of the first planetary gear set is connected to the eighth shaft, the eighth shaft is also connected to the sun gear of the second planetary gear set, and the eighth shaft can be detachably connected, via a third clutch, to the drive shaft, the drive shaft can be detachably connected, via a first clutch, to the fourth shaft, and the fourth shaft is connected to the ring gear of the first planetary gear set and the fourth shaft can be coupled, via a second brake, to the housing, the drive shaft can be detachably connected, via a second clutch, to the seventh shaft, and the seventh shaft is connected to both the carrier of the second planetary gear set and the ring gear of the third planetary gear set, the sixth shaft is connected to both the ring gear of the second planetary gear set and the carrier of the fourth planetary gear set, the third shaft is connected to the sun gear of the third planetary gear set and the third shaft can be coupled, via a first brake, to the housing, the fifth shaft is connected to both the carrier of the first planetary gear set and the sun gear of the fourth planetary gear set, and the fifth shaft can be coupled, via a third brake, to the housing, and the output shaft is directly connected to both the carrier of the third planetary gear set and the ring gear of the fourth planetary gear set.

12. The multi-stage transmission according to claim 11, wherein the first forward gear is attained by engaging the first and the third brakes and the third clutch, the second forward gear is attained by engaging the first and the second brakes and the third clutch, the third forward gear is attained by engaging the first brake and the first and the third clutches, the fourth forward gear is attained by engaging the first brake and the second and the third clutches, the fifth forward gear is attained by engaging the first, the second and the third clutches, the sixth forward gear is attained by engaging the second brake and the second and the third clutches, the seventh forward gear is attained by engaging the third brake and the second and the third clutches, the eighth forward gear is attained by engaging the second and the third brakes and the second clutch, the ninth forward gear is attained by engaging the third brake and the first and the second clutches, and the reverse gear is attained by engaging the first and the third brakes and the first clutch.

13. The multi-stage transmission according to claim 11, wherein the first forward gear is attained by engaging the first and the third brakes and the third clutch, the second forward gear is attained by engaging the first and the second brakes and the third clutch, the third forward gear is attained by engaging the first brake and the first and the third clutches, the fourth forward gear is attained by engaging the first and the second brakes and the second clutch, the fifth forward gear is attained by engaging the first, the second and the third clutches, the sixth forward gear is attained by engaging the second brake and the second and the third clutches, the seventh forward gear is attained by engaging the third brake and the second and the third clutches, the eighth forward gear is attained by engaging the second and the third brakes and the second clutch, the ninth forward gear is attained by engaging the third brake and the first and the second clutches, and the reverse gear is attained by engaging the first and the third brakes and the first clutch.

14. The multi-stage transmission according to claim 11, wherein the first forward gear is attained by engaging the first and the third brakes and the third clutch, the second forward gear is attained by engaging the first and the second brakes and the third clutch, the third forward gear is attained by engaging the first brake and the first and the third clutches, the fourth forward gear is attained by engaging the first brake and the first and the second clutches, the fifth forward gear is attained by engaging the first, the second and the third clutches, the sixth forward gear is attained by engaging the second brake and the second and the third clutches, the seventh forward gear is attained by engaging the third brake and the second and the third clutches, the eighth forward gear is attained by engaging the second and the third brakes and the second clutch, the ninth forward gear is attained by engaging the third brake and the first and the second clutches, and the reverse gear is attained by engaging the first and the third brakes and the first clutch.

15. The multi-stage transmission according to claim 11, wherein the first forward gear is attained by engaging the first and the third brakes and the third clutch, the second forward gear is attained by engaging the first and the second brakes and the third clutch, the third forward gear is attained by engaging the first brake and the first and the third clutches, the fourth forward gear is attained by engaging the first and the third brakes and the second clutch, the fifth forward gear is attained by engaging the first, the second and the third clutches, the sixth forward gear is attained by engaging the second brake and the second and the third clutches, the seventh forward gear is attained by engaging the third brake and the second and the third clutches, the eighth forward gear is attained by engaging the second and the third brakes and the second clutch, the ninth forward gear is attained by engaging the third brake and the first and the second clutches, and the reverse gear is attained by engaging the first and the third brakes and the first clutch.

16. The multi-stage transmission according to claim 11, wherein the multi-stage transmission is an automatic transmission for a motor vehicle.

\* \* \* \* \*